(12) United States Patent
Sone

(10) Patent No.: US 6,223,057 B1
(45) Date of Patent: Apr. 24, 2001

(54) RADIO APPARATUS HAVING A TELEPHONE NUMBER BOOK WITH ADAPTABLE STORAGE AND RETRIEVAL INDEXING

(75) Inventor: Tomoshi Sone, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/169,584

(22) Filed: Oct. 9, 1998

(30) Foreign Application Priority Data

Oct. 22, 1997 (JP) .................................................. 9-289785

(51) Int. Cl.⁷ ...................................................... H04B 1/38
(52) U.S. Cl. .......................... 455/564; 455/90; 455/550; 455/566; 455/579; 379/354; 379/355
(58) Field of Search .................................. 455/564, 566, 455/550, 579, 90; 379/354, 355

(56) References Cited

U.S. PATENT DOCUMENTS

| | | |
|---|---|---|
| 5,099,507 | 3/1992 | Mukai et al. . |
| 5,675,324 | 10/1997 | Hashimoto et al. . |
| 5,677,949 * | 10/1997 | Macor ................................. 379/354 |
| 5,758,295 * | 5/1998 | Ahlberg et al. ....................... 455/566 |
| 5,915,228 * | 6/1999 | Kunihiro et al. ..................... 455/575 |
| 5,926,769 * | 7/1999 | Valimaa et al. ...................... 455/564 |
| 5,966,671 * | 10/1999 | Mitchell et al. ..................... 455/575 |
| 5,987,336 * | 11/1999 | Sudo et al. .......................... 455/566 |
| 5,999,827 * | 12/1999 | Sudo et al. .......................... 455/564 |
| 6,021,321 * | 2/2000 | Kawashima ....................... 455/186.1 |

FOREIGN PATENT DOCUMENTS

| | | |
|---|---|---|
| 2 314 440 | 12/1997 | (GB) . |
| 61-107854 | 5/1986 | (JP) . |
| 64-53659 | 3/1989 | (JP) . |
| 3-214845 | 9/1991 | (JP) . |
| 8-242278 | 9/1996 | (JP) . |
| 8-288996 | 11/1996 | (JP) . |

\* cited by examiner

*Primary Examiner*—Curtis Kuntz
*Assistant Examiner*—Barry W. Taylor
(74) *Attorney, Agent, or Firm*—Scully, Scott, Murphy & Presser

(57) ABSTRACT

A radio apparatus having a storage unit, an operation unit and a control unit. The storage unit has a plurality of storage areas, each of which corresponds to a plurality of directories where names and telephone numbers can be stored. The operation unit has two selection keys for scrolling through a list of directory options and a determination key for selecting the desired option. The control unit controls a display unit to display the plurality of directory names and selects one of the plurality of displayed directory names in response to user input through the selection and determination keys. Upon receiving user input the control unit controls the display unit to display a sequence of letters whereby the user can select a name for the telephone number stored in the memory corresponding to that name. The control unit also produces new directory names and allocates storage area of the storage unit to a directory having a new directory name in response to operation of the selection and determination keys.

15 Claims, 8 Drawing Sheets

Fig. 6

PRODUCE TELEPHONE NUMBER LIST

TELEPHONE NUMBER REGISTRATION LIST

1. FRIENDS

2. TEACHERS

3. FELLOW WORKERS

4. GIRL FRIENDS

RADIO APPARATUS HAVING A TELEPHONE NUMBER BOOK WITH ADAPTABLE STORAGE AND RETRIEVAL INDEXING

BACKGROUND OF THE INVENTION

1. Field of the Invention

The present invention relates to a radio apparatus such as a wireless selective call receiver and a portable transmitting and receiving radio apparatus, and more particularly to a radio apparatus such as a wireless selective call receiver and a portable transmitting and receiving radio apparatus having a telephone number book.

2. Description of the Related Art

In a conventional information terminal equipment, a telephone line is used as the tool to exchange information with a counter party. Also, a telephone number book registration function is provided instead of a memorandum for a telephone number.

For example, according to Japanese Laid Open Patent Application (JP-A-Showa 64-53659), a telephone has a memory and a display unit used to display or confirm a registration number of a reduced dialing numbers as a multi-function telephone. Also, in the telephone, a counter party name information and a counter party telephone number data are dialed with previously determined internal codes subsequent to a first key pattern and stored in the memory after the telephone is off-hooked. When a second key pattern is dialed, name data and the telephone number data which have been stored in the memory are read out and displayed, and then when a first specific key is dialed, the displayed data is updated. When a second specific key is dialed, the displayed telephone number data is sent out from a dial sending section. When the name data and the telephone number data are dialed following a third key pattern, these data are deleted from the memory.

Also, according to Japanese Laid Open Patent Application (JP-A-Showa 61-107854), which relates to a display phone which has an automatic dialing function. The display phone is composed of a memory section which stores many names to which the automatic dialing function should be performed, in the order of dial sending frequency, an input/output and display unit which displays the names read out from the memory in order of dial sending frequency, and outputs a selection signal for the name selected from among the displayed names, a telephone functional section which starts the automatic dialing function with the displayed name in response to the selection signal, and a retrieval processing section which rearranges all the read names in the order of dial transmission frequency to store in the memory section, after counting up a dial transmission frequency file of the name with which communication is ended, in response to a communication end signal from the telephone function section.

Recent years, a function to smoothly reply to a received message or to register frequently used telephone numbers to a telephone number book is provided to a wireless selective call receiver with a display. Also, a transmitting side telephone number notifying system is recently started, so that a transmitting side telephone number is notified to a receiving side and displayed on the receiving side. In this manner, since it becomes possible to notify the transmitting side telephone number, the relieved sense is given to the receiving side.

However, in retrieving means for retrieving registrants from a telephone number book of a conventional wireless selective call receiver with a display, the registrants are outputted in the order of alphabet or in the order of higher use frequency. For this reason, when a telephone number with a low use frequency should be selected, or when the number of registrants increases, it is necessary to push a selection button many times or to continue to push the selection button. As a result, a heavy load is imposed to the selection button or a switch unit of the receiver which is composed of the minimum number of buttons and small part switches. Also, the retrieval takes a long time.

SUMMARY OF THE INVENTION

The present invention is accomplished in view of the above problems. Therefore, an object of the present invention is to provide a radio apparatus and a method of managing a telephone number book, in which retrieval from the telephone number book is facilitated.

Another object of the present invention is to provide a radio apparatus and a method of managing a telephone number book, in which load imposed on a switch unit can be reduced so that the quality of the radio apparatus such as a portable receiver and a portable transmitting and receiving radio apparatus can be maintained.

In order to achieve an aspect of the present invention, a radio apparatus includes a storage unit having a plurality of storage areas respectively corresponding to a plurality of directories to which names are respectively allocated, a display unit, and an operation unit having a first selection key, a second selection key and a determination key. A control unit having a memory which stores a telephone number. The control unit controls the display unit to display the plurality of directory names, and selects one of the plurality of displayed directory names based on operations of the first selection key, and the second selection key and the determination key of the operation unit. Then, the control unit controls the display unit to display a sequence of letters in a registration mode, and produces a name for the telephone number stored in the memory. The name is composed of at least one letter which is selected from the displayed sequence of letters based on operations of the first selection key, second selection key and determination key of the operation unit. Finally, the control unit stores the name and the telephone number in one of the plurality of directories of the storage unit which corresponds to the selected directory name.

The control unit may control the display unit to display the sequence of letters in the registration mode, produces a new directory name composed of at least one letter which is selected from the displayed sequence of letters based on operations of the first selection key, second selection key and determination key of the operation unit, and allocates a storage area of the storage unit to a directory having the new directory name in response to an operation of the determination key.

When the radio apparatus includes a radio unit for receiving a radio call, the control unit may store the telephone number of the radio call received by the radio unit. Alternately, the control unit may control the display unit to display the sequence of letters in the registration mode, produce a new telephone number composed of at least one letter which is selected from the displayed sequence of letters based on operations of the first selection key, second selection key and determination key of the operation unit, and store the produced telephone number in the memory as the telephone number.

When the operation unit further includes a menu key, the control units may control the display unit to display a data indicative of registration, a data indicative of read and a data indicative of management. In this case, the registration mode is set when the registration data is selected based on operations of the first selection key, second selection key and determination key of the operation unit, a read mode is set when the read data is selected based on operations of the first selection key, second selection key and determination key of the operation unit, and a management mode is set when the management data is selected based on operations of the first selection key, second selection key and determination key of the operation unit.

In the read mode, the control unit may control the display unit to display sets of the name and the telephone number, when one of the plurality of directory names which has been displayed on the display unit is selected based on operations of the first selection key, second selection key and determination key of the operation unit, and control a radio unit to automatically call one of the sets, when the one of the sets is selected based on operations of the first selection key, second selection key and determination key of the operation unit.

Also, in the management mode, the control unit may control the display unit to display management data of one of the plurality of directories corresponding to the designated directory name, the management data including a directory size data, when one of the plurality of directory names which has been displayed on the display unit is selected based on operations of the first selection key, second selection key and determination key of the operation unit. Then, the control unit may change a size of the storage area of the directory corresponding to the selected directory name based on a new directory size data, when the new directory size data is inputted based on operations of the first selection key, second selection key and determination key of the operation unit in the management mode.

In order to achieve another aspect of the present invention, a method of managing telephone numbers in a radio apparatus, includes the steps of:

displaying a name of each of a plurality of directories in a registration mode, each of the plurality of directories having a storage area;

designating one of the plurality of displayed directory names;

inputting a name corresponding to a telephone number; and storing the name and the telephone number in one of the plurality of directories of the storage unit which corresponds to the designated directory name.

When a new directory name is inputted in the registration mode, a storage area is allocated to a directory having the new directory name in response to the input of the new directory name.

The telephone number received through a radio communication may be used in the registration mode, or the telephone number may be inputted in the registration mode.

One of the registration mode, a read mode and a management mode may be selected. In the read mode, the plurality of directory names is displayed and one of the plurality of displayed directory names is designated. Then, the names and the telephone numbers of one of the plurality of directories which has the designated directory name are displayed and one of the displayed names is designated. Subsequently, an automatic calling function may be performed to call one of the displayed telephone numbers corresponding to the designated names.

In the management mode, the plurality of directory names is displayed and one of the plurality of displayed directory names is designated. Then, management data of one of the plurality of directories corresponding to the designated directory name is displayed. The management data includes a directory size data. When a new directory size data is inputted, a size of the storage area of the directory corresponding to the designated directory name is changed based on the new directory size data.

In order to achieve still another aspect of the present invention, a radio apparatus includes a storage unit having a plurality of directories each of which has a storage area, a display unit for displaying a name of each of the plurality of directories in a registration mode, a directory designating section for designating one of the plurality of displayed directory names, a name inputting section for inputting a name corresponding to a telephone number, and a storing section for storing the name and the telephone number in one of the plurality of directories of the storage unit which corresponds to the designated directory name.

BRIEF DESCRIPTION OF THE DRAWINGS

FIG. 6 is a diagram illustrating an example of the operation of the telephone number book registration in the present invention;

FIG. 7 is a diagram illustrating an example of directories of the telephone number book in the present invention;

DESCRIPTION OF THE PREFERRED EMBODIMENTS

Next, a radio apparatus of the present invention will be described below in detail with reference to the attached drawings.

First, the radio apparatus according to the first embodiment of the present invention will be described, using a wireless selective call receiver as an example.

Figure 1:
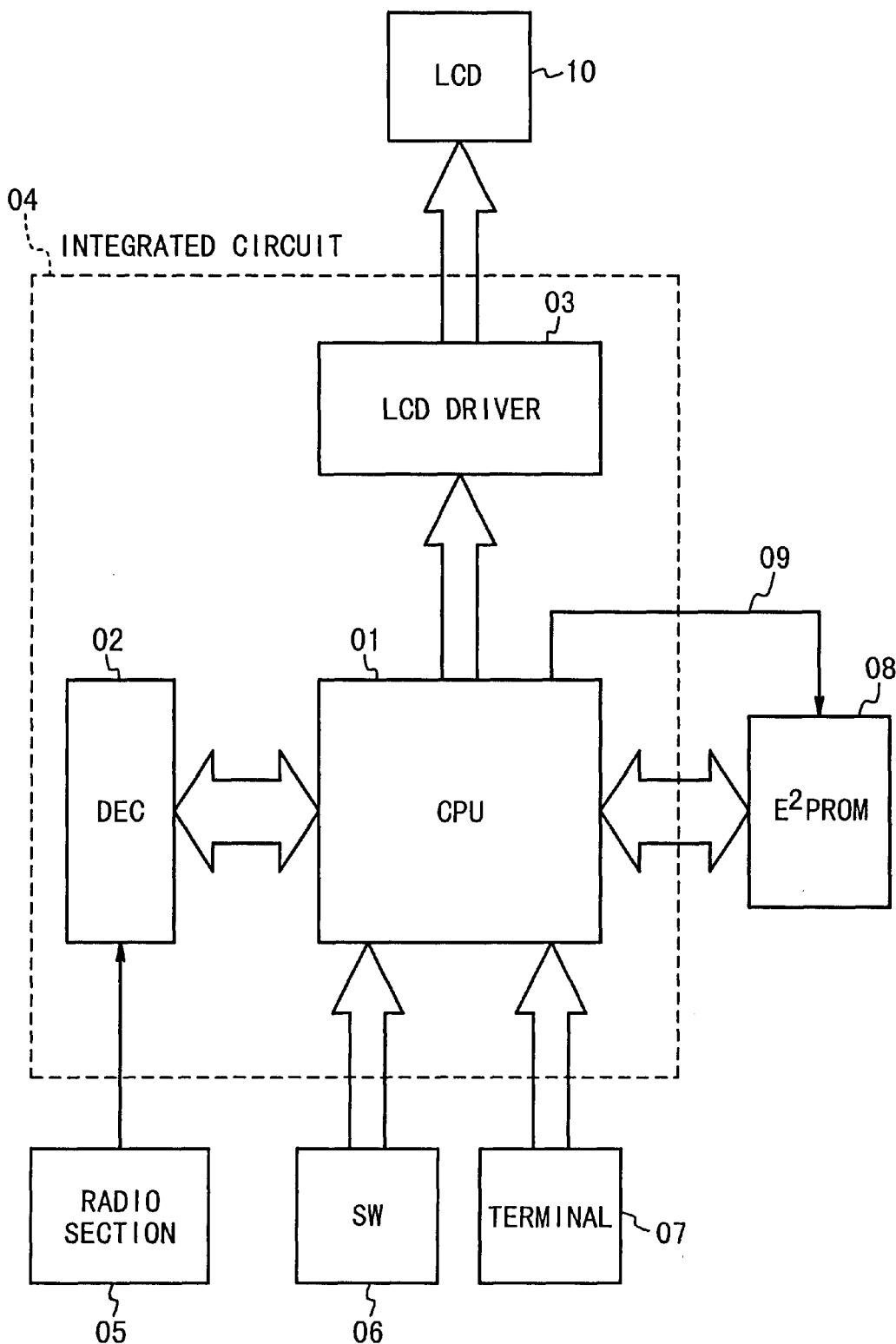
FIG. 1 is a block diagram illustrating the structure of a radio apparatus according to a first embodiment of the present invention.

FIG. 1 shows the structure of the wireless selective call receiver according to the first embodiment of the present invention. In FIG. 1, the wireless selective call receiver 23 is composed of an integrated circuit 04, a radio section 05, a switch unit (SW) 06, a terminal section 07, a storage unit ($E^2$PROM) 08, a control line 09 and a display unit (LCD) 10. The integrated circuit 04 is composed of a CPU 01 with a memory (not shown), a decoder (DEC) 02, and an LCD driver 03.

Figure 2:
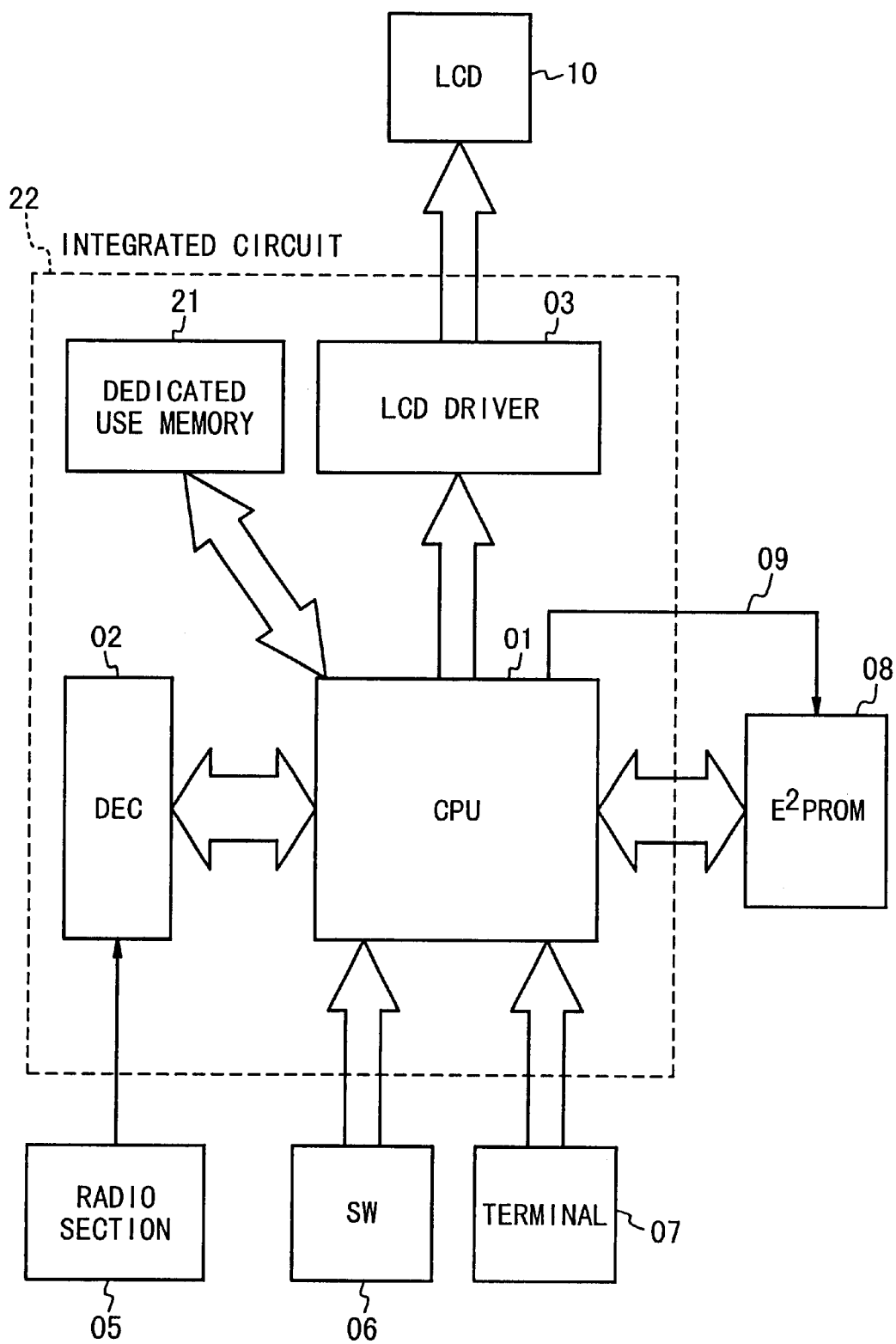
FIG. 2 is a block diagram illustrating the structure of the radio apparatus according to a second embodiment of the present invention.

FIG. 2 shows the structure of the wireless selective call receiver 23 according to the second embodiment of the present invention. In FIG. 2, the wireless selective call receiver 23 has an exclusive use memory 21 in the integrated circuit 22 in addition to the components shown in FIG. 1. Because the storage unit ($E^2PROM$) 08 shown in FIG. 1 stores function information selection bits which is associated with the function of the receiver 23, a telephone number book area is limited. For this reason, the exclusive use memory 21 is provided for the exclusive use of the telephone number book area.

In this case, in case of so-called radio call (pager) of a usual wireless selective call receiver, 1 frame of 29 seconds are divided into 15 groups in case of 1200 bps NTT method, for example. In this case, each group is composed of a sync signal, an address/message discriminating signal, a plurality of call signals and a phase compensation signal. The groups are repeatedly sent out in order in units of frames. When a wireless selective call receivers are present, each wireless selective call receiver belongs to either one of the groups of the frame. The wireless selective call receiver receives the sync signal of the group to which it belongs, and receives a selective call signal in the group. Thus, the wireless selective call receiver intermittently receives only the groups to which it belongs during the one frame.

A ratio of the intermittent reception is 1:15, depending upon the number of groups. Recently, the ratio in a range of 1:42 to 1:112 is employed. In this way, when the groups are sent for the telephone number of the wireless selective call receiver, a transmitting side telephone number and a transmitting side name are received and automatically stored in the memory of the CPU 01. Moreover, when a predetermined directory is set, the transmitting side telephone number and the transmitting side name are stored in the storage unit ($E^2PROM$) 08.

Next, the operation of the radio apparatus such as the wireless selective call receiver will be described below.

The CPU 01 has the above-mentioned necessary and minimum memory. When a radio signal is received by the radio section 05, and the decoder (DEC) 02 receives and decodes the signal outputted from the radio section 05, the CPU 01 sends out a control signal to the decoder (DEC) 02 in accordance with a program which is stored in the memory. On the other hand, the storage unit ($E^2PROM$) 08 has the function selection bits which relates to the function of the receiver and is provided with a storage area which is necessary for registration of the telephone number book in the present invention. When a key switch of the switch unit (SW) 06 which is previously designated for power-on of the receiver is pushed, the CPU 01 outputs an instruction to the storage unit ($E^2PROM$) 08 via the control line 09 to read the function selection bits from the storage unit ($E^2PROM$) 08. Then, the CPU 01 outputs instructions to the decoder (DEC) 02 and the LCD driver 03 to drive the display unit (LCD) 10 such that it is informed that the power supply is turned on.

Next, when the registration and read of the telephone number book in the present invention are instructed through the operation of the switch unit (SW) 06, the CPU 01 outputs an instruction onto control line 09 to instruct the write of the telephone number book into the storage unit ($E^2PROM$) 08 in case of a telephone number book registration mode and the read of the telephone number book from the storage unit ($E^2PROM$) 08 in case of a telephone number book mode.

Also, as shown in FIG. 2, it is possible to provide the receiver 23 such that the integrated circuit 22 has the exclusive use memory 21 which is necessary to register the telephone number book in the present invention.

Moreover, in order to sufficiently utilize the storage area of the storage unit ($E^2PROM$) 08 or the exclusive use memory 21 for the telephone number book, it is made possible for the user to optionally set the number of directories and the number of registrants which can be stored in each directory.

Figure 3:
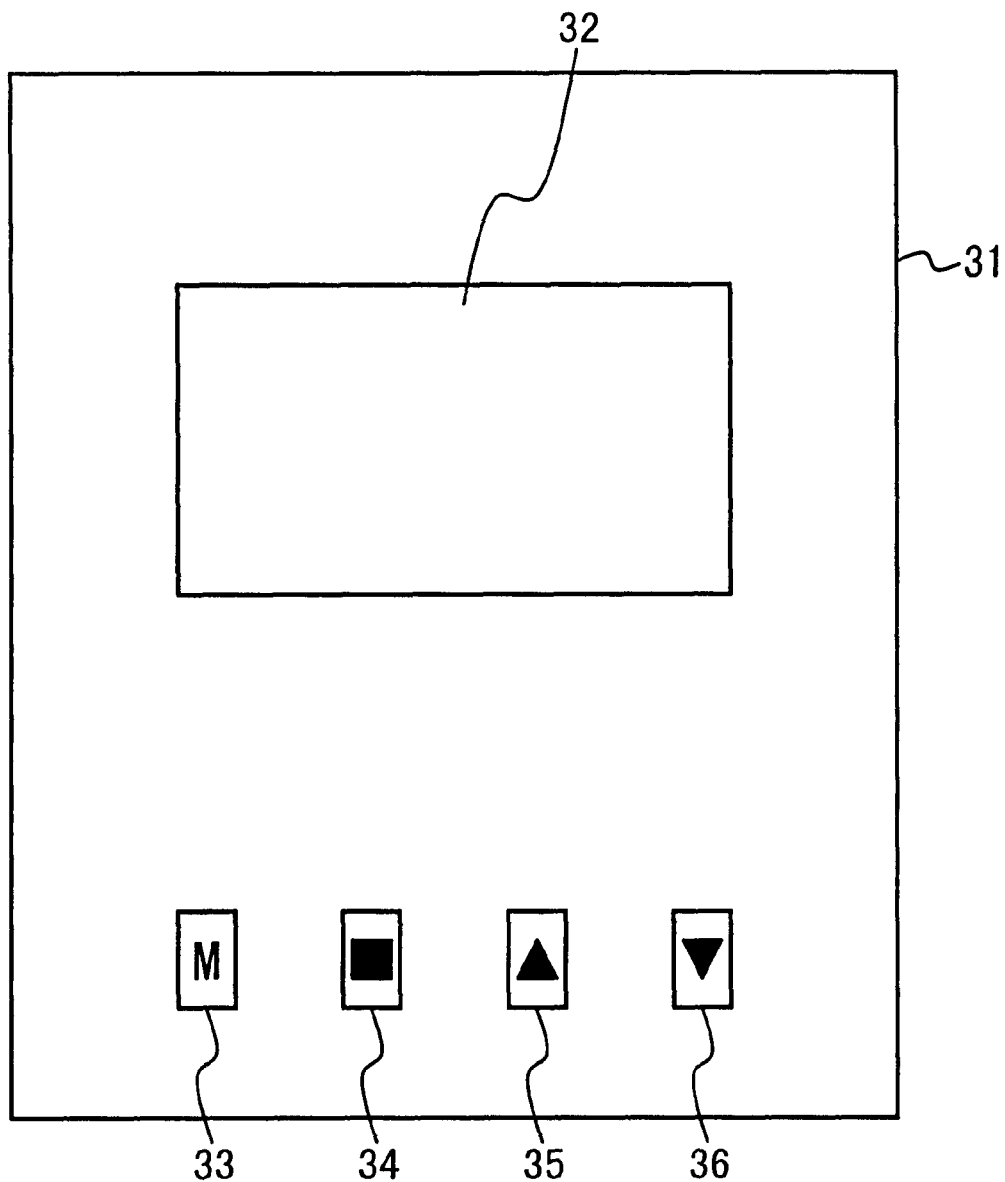
FIG. 3 is an outward appearance of the radio apparatus of the present invention.

Next, the operation of the wireless selective call receiver in the telephone number book registration will be described with reference to FIGS. 3 and 4. FIG. 3 is an outward appearance of the receiver 31. The structure of the telephone number book 41 is shown in FIG. 4.

In FIG. 3, the wireless selective call receiver 31 is composed of a display unit 32 which corresponds to the display unit (LCD) 10, and an operation unit. The operation unit is composed of a menu selection switch (M) 33 which is used to instruct the display of the menu display, a determination switch (■) 34 which is used to instruct determination of data on the display, an upper direction selection switch (▲) 35 which is used to instruct to move an icon in an upper direction on the screen, and a lower direction selection switch (▼) 36 which is used to instruct to move the icon in the lower direction on the screen. When a telephone number book 41 is selected from the menu display through the operation of the menu selection switch 33, the telephone number book registration 51, the telephone number book read 81 and the telephone number book management 111 are displayed on the display unit 32 such that one of them can be selected.

Figure 4:
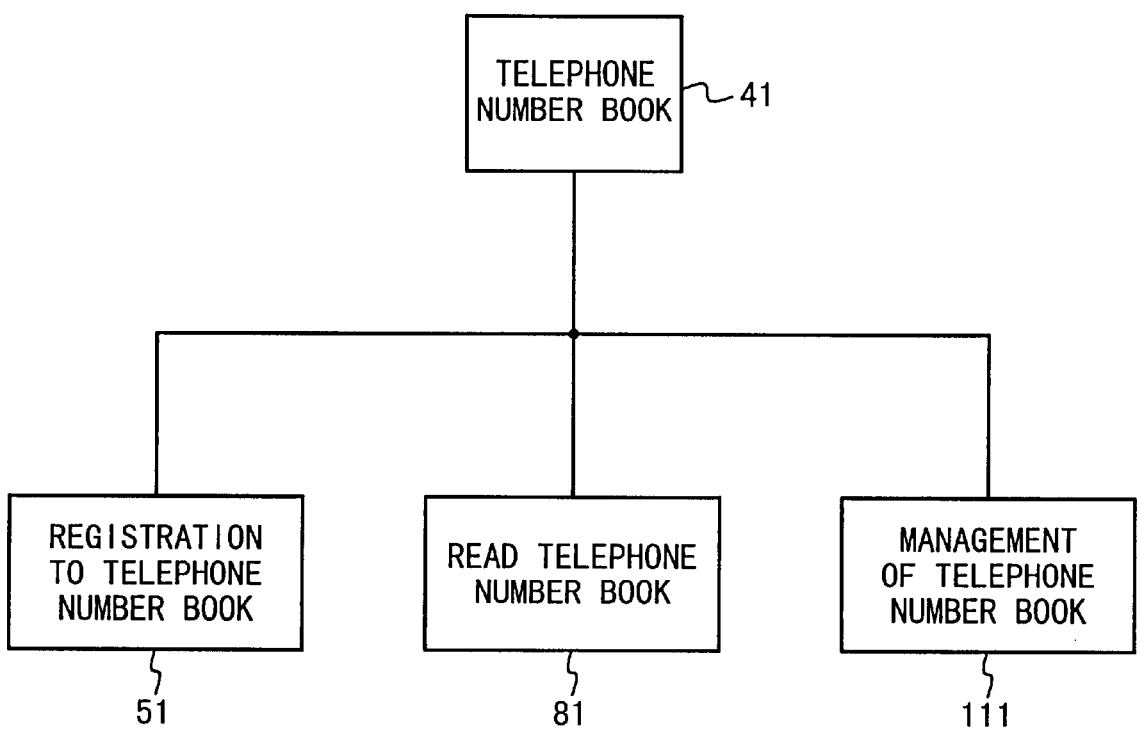
FIG. 4 is a diagram illustrating the hierarchical structure of a telephone number book of the present invention.
Figure 5:
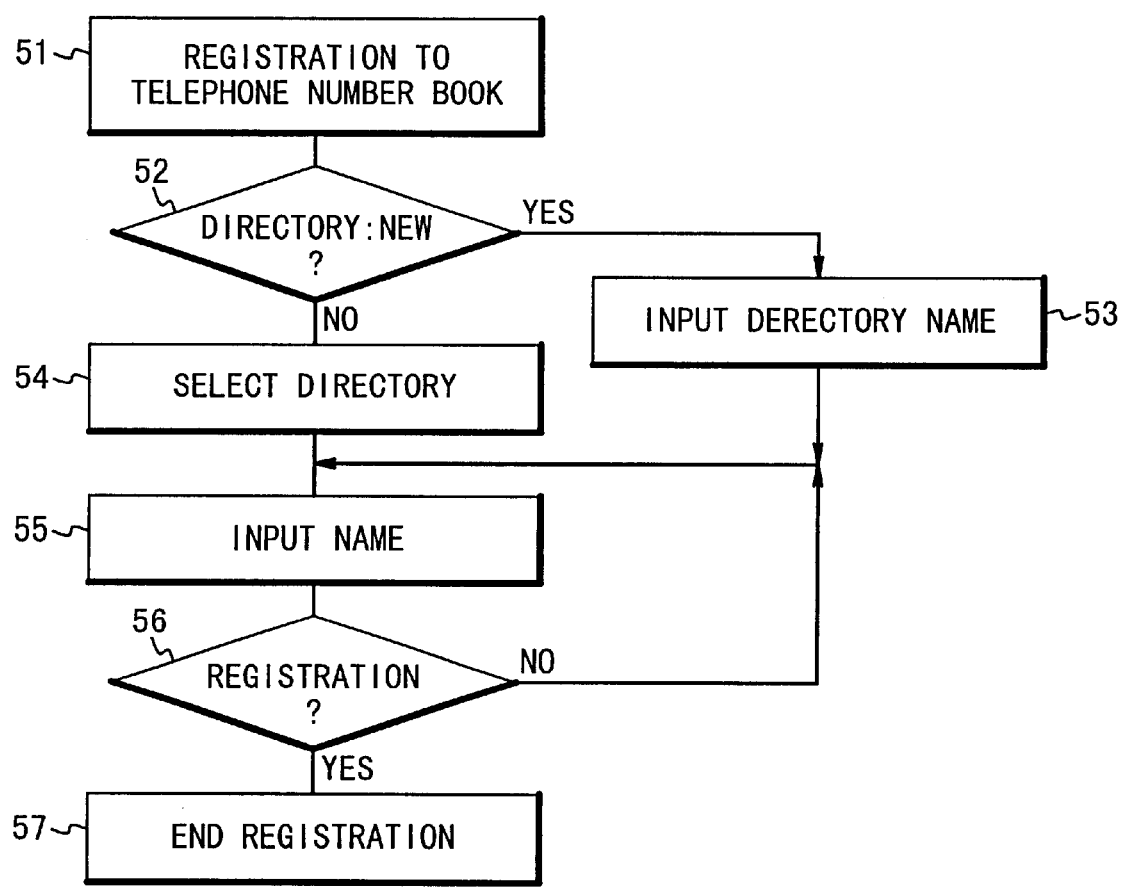
FIG. 5 is a flow chart illustrating the operation of telephone number book registration of the present invention.

In this case, in FIG. 4, the hierarchical structure of the telephone number book 41 which has the contents peculiar to the wireless selective call receiver is composed of the telephone number book registration 51, the telephone number book read 81 and the telephone number book management 111. In the telephone number book 41, a name, a telephone number, an address, an age, specific items are registered as essential items. The telephone number book read 81 is used to read the contents stored in the telephone number book 41. The telephone number book management 111 mainly stores the management data of each directory, and is used to sort the telephone numbers and to update the names and so on.

In this case, when the menu selection switch 33 of the switch unit (SW) 06 is pushed, a menu list is displayed on the display unit 32. When the telephone number book 41 is selected through the operations of the upper direction selection (▲) switch 35 and/or lower direction selection (▼) switch 36, the telephone number book registration 51, the telephone number book read 81 and the telephone number book management 111 are displayed. When one of them is selected through the operations of the upper direction selection (▲) switch 35 and lower direction selection (▼) switch 36, and then when the determination (■) switch 34 is pushed, the setting is established.

Next, a method of registering of a telephone number into the telephone number book will be described with reference to FIG. 3, FIG. 4, FIG. 5 and FIG. 6. When the telephone number book registration 51 is selected from the telephone number book 41, "Directory New?" 52 is displayed on the display unit 32. When one of the upper direction selection (▲) switch 35, the lower direction selection (▼) switch 36, "YES" and "NO" is selected, the selection is determined through the operation of the determination (■) switch 34.

When "YES" is selected, the control goes to a directory name input 53. In this case, when the telephone number book registration 51 is selected, the display letter input situation of "telephone number list production. 1. a selection of one from a letter string in the lowest line" is displayed, as shown in FIG. 6. Thus, "yu" is inputted through the letter selection by operating the upper direction selection (▲) switch 35 and the lower direction selection (▼) switch 36. In this case, when the upper direction selection (▲) switch 35 is pushed, the icon moves to the left direction, and when the lower direction selection (▼) switch 36 is pushed, the icon moves to the right direction.

In the letter selection, one of a letter string such as "hiragana letter", "voiced consonant mark", "kutouten", and numerals is selected through the operations of the upper direction selection (▲) switch 35 and lower direction selection (▼) switch 36, and the selection is determined through the operation of the determination (■) switch 34. Then, the control goes to the following letter. When the menu selection (M) switch 33 is pushed, the directory input 53 is completed and ended. Next, the control goes to the name input 55.

When "directory new?" 52 is displayed on the display unit 32, and "NO" is selected, the control goes to a directory selection mode 54, in which "1: friends, 2: teacher, 3: work fellows, 4: girl friends" are displayed as shown in FIG. 7.

In FIG. 7, a plurality of directories 71 in the telephone number book registration 51 are displayed. The directory name used from now is determined through the operation of the upper direction selection (▲) switch 35, the lower direction selection (▼) switch 36 and the determination (■) switch 34. Thus, the control goes to the name input 55. The name input 55 is performed using the upper direction selection (▲) switch 35 and the lower direction selection (▼) switch 36, and then, when the determination (■) switch 34 is pushed, "YES" or "NO" is selected in the registration 56. Thereafter, when the determination (■) switch 34 is operated for the determination, the registration of the telephone number into the telephone number book 57 is ended. In case that the registration 51 into the telephone number book is continued to be performed, the determination (■) switch 34 is pushed. When the registration 51 into the telephone number book is ended, the menu selection (M) switch 33 is pushed.

In the above-mentioned case, the telephone number which is stored in the memory of the CPU 01 through the reception of the radio signal may be used. Alternately, the telephone number may be inputted in the same manner as the input of the directory name, before the telephone number book registration 51 is started.

Figure 8:
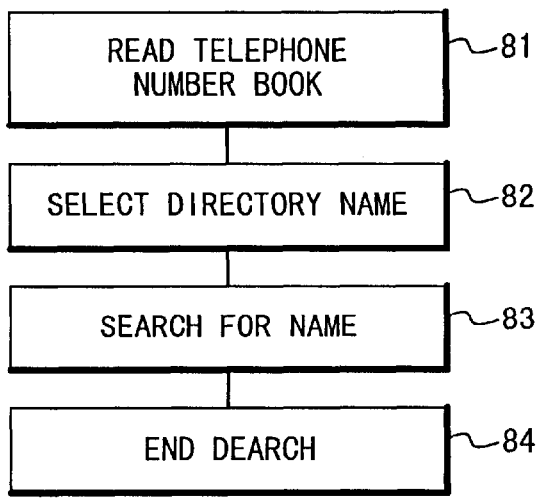
FIG. 8 is a flow chart illustrating the operation of telephone number book read in the present invention.
Figure 9:
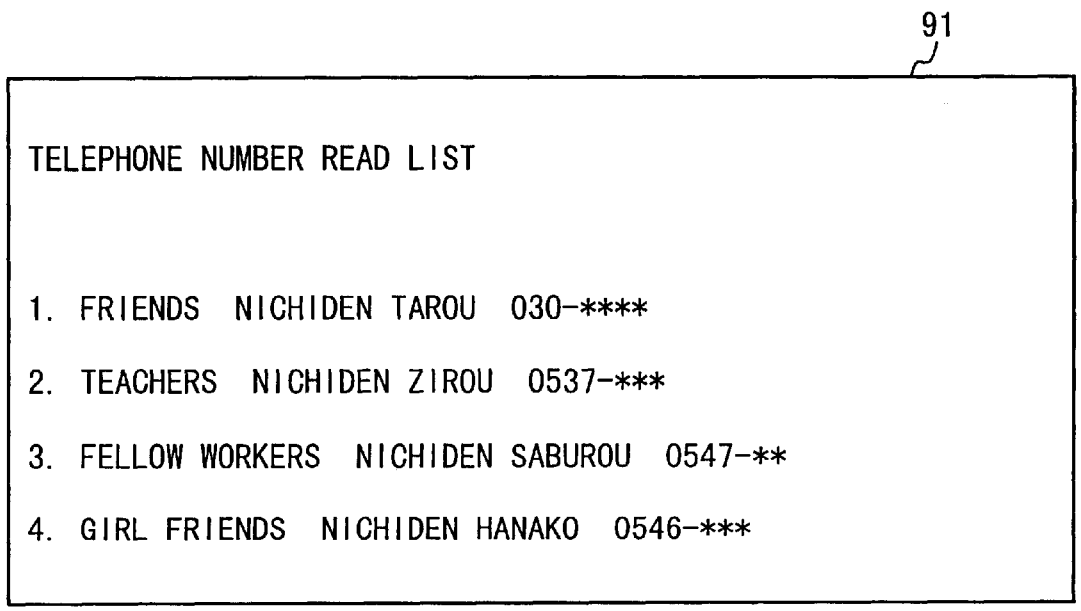
FIG. 9 is a diagram illustrating a list of directories in the telephone number book read in the present invention.

Next, the read from the telephone number book will be described with reference to FIG. 3, FIG. 4 and FIG. 8. When the menu selection (M) switch 33 is pushed, the menu list is displayed on the display unit 32. The telephone number book 41 is selected through the operations of the upper direction selection (▲) switch 35 and lower direction selection (▼) switch 36. Then, the read of the telephone number book 81 is selected through the operations of the upper direction selection (▲) switch 35 and lower direction selection (▼) switch 36, and the determination (■) switch 34 is pushed. Thus, the telephone number book read list is determined. FIG. 9 shows the telephone number book read list. In the telephone number book read list, the directories registered already, and the registrants with high use frequencies who are registered in the directories, or the latest registered registrants 91 are displayed on the display unit 32.

Figure 10:
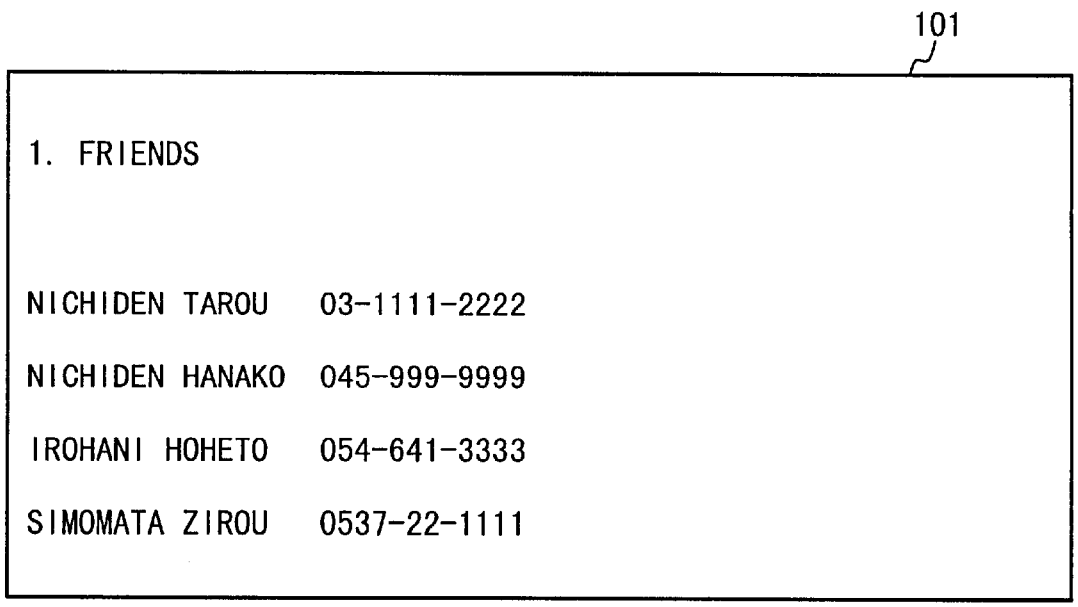
FIG. 10 is a diagram illustrating a list of telephone numbers in the telephone number book read of the present invention.

Next, a target directory is selected through the operations of the upper direction selection (▲) switch 35 and lower direction selection (▼) switch 36 and the selected directory is determined though the operation of the determination (■) switch 34. The case where the "friends" directory in FIG. 9 is selected will be described as an example with reference to FIG. 10.

When the "friends" directory is selected from the directory 91 through the operation of determination (■) switch 34, the registrants 101 who are registered into the directory of "friends" are displayed on the display unit 32. The registrants are displayed on the display unit 32 in the order of higher use frequency, or the order of the latest registration as the displayed order, considering the convenience of use.

Figure 11:
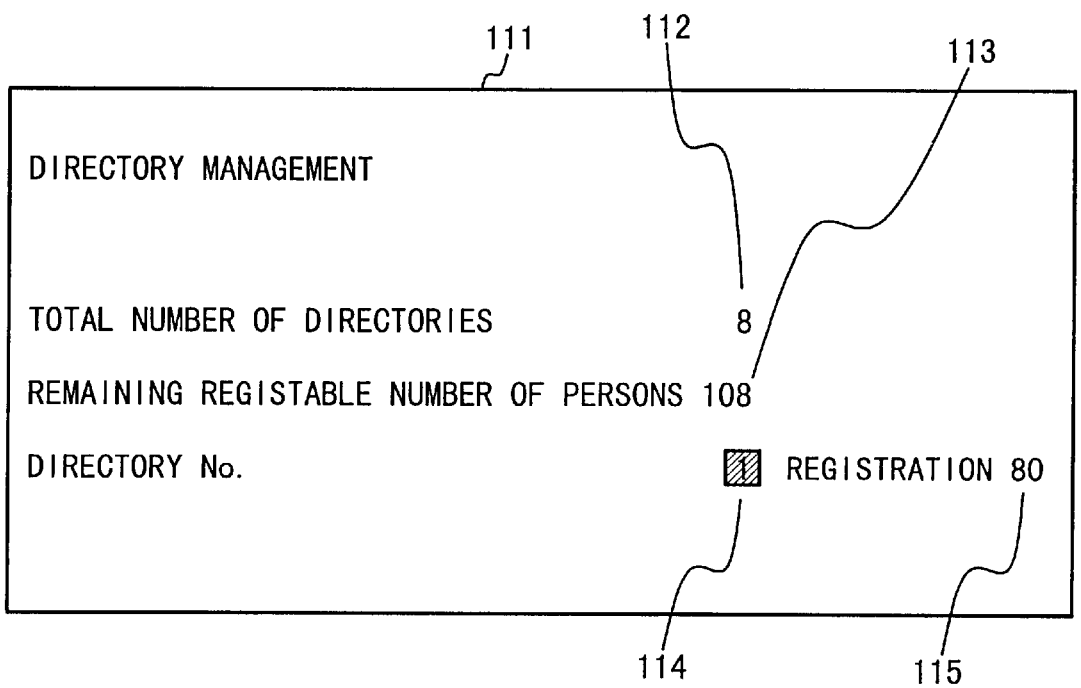
FIG. 11 is a diagram illustrating an example of telephone number book management of the present invention.

Next, the telephone number book management will be described with reference to FIG. 3, FIG. 4 and FIG. 11. When the menu selection (M) switch 33 is pushed, the menu list is displayed on the display unit 32. The telephone number book 41 is selected through the operations of the upper direction selection (▲) switch 35 and lower direction selection (▼) switch 36. Then, the telephone number book management 111 is selected through the operations of the upper direction selection (▲) switch 35 and lower direction selection (▼) switch 36, and the determination (■) switch 34 is pushed so that the control goes to the telephone number book management. FIG. 11 shows a display example of the telephone number book management 111. In a display example of the telephone number book management 111, the total number of directories 112, the number of registrants 113 who can be still registered, the selected directory No. 114, and the number of registrants 115 who can be already registered in the selected directory number 114 are displayed on the display unit 32. When the user selects the selected directory number 114, the number of registrants 115 who are already registered in the directory at present is displayed. When the user wants to change the registerable number of registrants 113 who are possible to be registered, the registerable number of registrants 113 is selected through the operations of the upper direction selection (▲) switch 35 and lower direction selection (▼) switch 36, and then the determination (■) switch 34 is pushed. Subsequently, the registerable number of registrants 113 is changed through the operations of the upper direction selection (▲) switch 35 and lower direction selection (▼) switch 36, in the same manner as in the input of the directory name. Then, the determination (■) switch 34 is pushed to confirm the change.

It should be noted that the terminal units 07 shown in FIG. 1 and FIG. 2 are a connection terminal with an external equipment. For instance, by connecting with the terminal equipment such as a personal computer, the telephone number book registration 51 and the telephone number book read 81 become possible. The collective registration of directory names and registrants and the output of a list of registration names can be performed easily.

The registration, read and management of the telephone number book in the wireless selective call receiver of the above-mentioned embodiment are described. In this case, the display of each menu screen and each processing are possible to easily execute in accordance with an operation program in the CPU 01. Also, an example of telephone number book is shown to have the hierarchical structure of 2-layer tree structure as shown in FIG. 4 as the above telephone number book. However, it is possible to make the telephone number book to have the tree structure with three or more layers. As shown in FIG. 3, the telephone number book which is easy to become complicated can be simply installed in the wireless selective call receiver such as a pager with the small number of key switches such as four switches SW 06 of the menu selection (M) switch 33, the determination (■) switch 34, the upper direction selection (▲) switch 35, and the lower direction selection (▼) switch 36. Therefore, the effective advantage can be obtained.

Also, in the above embodiment, the telephone number book with the tree structure is explained. However, in addition to the telephone number book, directories may be set for the dates when messages peculiar to the wireless selective call receiver are received. In this case, it becomes easy to confirm when the messages are received. In this case, the message transmitter is stored in the storage unit ($E^2$PROM) 08 together with the reception time, the effective date and time information and the telephone number. Thus, the confirmation and selection of the messages can be effectively utilized.

Also, in case of the above wireless selective call receiver, the telephone number of the registrant counter party is read out and selected on the display screen of the telephone number book read 81 of the telephone number book 41, and then a button is pushed so as to convert the telephone number into DTMF tones to output them. Also, in case that the above wireless selective call receiver is PHS, the automatic dialing function is performed. In this way, it is possible to call simply.

Further, in case that the above wireless selective call receiver is a pager of the second generation radio call, the following matters are being defined. That is, the number of times of repetitive transmission is set to be variable in the high-speed transmission of a maximum of 6,400bps. Also, the long sentence division transmission of 29 to 235 letters, a transparent transmission as a flexible frame structure, and an individual receiver control (OTA: Over The Air pager Control) and so on are made possible. Further, international roaming becomes possible. When such a high function is expected, it is possible to easily call the telephone number of a desired party by utilizing the telephone number book of the present invention. Further, the directory for the telephone number book registration is set by the owner of the receiver in accordance with an arrived call. However, the telephone number can be automatically stored. In this case, the name of the caller is entered after the storage of the telephone number. Thus, the telephone number book registration can be simply performed.

According to the present invention, the persons being registered already can be roughly classified into directories. Also, one of the persons can be easily retrieved. Therefore, the retrieval time can be greatly reduced.

Also, the number of times of pushing the selection buttons until a desired registrant is selected can be greatly reduced, compared with the case where the registration content is read from the telephone number book in the conventional receiver. Therefore, the load which is imposed to the selection button which is composed of small parts can be reduced and the quality of the receiver can be maintained.

Moreover, by using such a telephone number book, the selection call is made possible easily with few key switches in the call to the counter party.

What is claimed is:

1. A radio apparatus comprising:
    a storage unit having a plurality of storage areas of predetermined sizes, the storage areas respectively corresponding to a plurality of directories to which names are respectively allocated;
    a display unit;
    an operation unit having a first selection key, a second selection key and a determination key;
    a control unit having a memory which stores a telephone number,
        for controlling said display unit to display said plurality of directory names,
        for selecting one of the plurality of displayed directory names based on operations of said first selection key, said second selection key and said determination key of said operation unit,
        for controlling said display unit to display a sequence of letters in a registration mode,
        for producing a name for said telephone number stored in said memory, said name being composed of at least one letter which is selected from said displayed sequence of letters based on operations of said first selection key, second selection key and determination key of said operation unit, and
        for storing said name and said telephone number in one of said plurality of directories of said storage unit which corresponds to said selected directory name, said control unit controls said display unit to display one or more data points indicative of registration, one or more data points indicative of read and one or more data points indicative of management, and
    sets said registration mode when said one or more data points indicative of registration are selected based on operations of said first selection key, second selection key and determination key of said operation unit,
    a read mode when said one or more data points indicative of read are selected based on operations of said first selection key, second selection key and determination key of said operation unit, and
    a management mode when said one or more data points indicative of management are selected based on operations of said first selection key, second selection key and determination key of said operation unit,
    said control unit
        controls said display unit to display one or more data points indicative of management of one or more of said plurality of directories corresponding to said designated directory name, said management data including directory size, when one of said plurality of directory names which has been displayed on said display unit is selected based on operations of said first selection key, second selection key and determination key of said operation unit in said management mode, and
        changes the size of said storage area of said directory corresponding to said selected directory name based on a new directory size when the new directory size is inputted based on operations of said first selection key, second selection key and determination key of said operation unit in said management mode.

2. A radio apparatus according to claim 1, wherein said control unit controls said display unit to display said sequence of letters in said registration mode, produces a new directory name composed of at least one letter which is selected from said displayed sequence of letters based on operations of said first selection key, second selection key and determination key of said operation unit, and allocates a storage area of said storage unit to a directory having said new directory name in response to an operation of said determination key.

3. A radio apparatus according to claim 1, further comprising a radio unit for receiving a radio call, and
    wherein said control unit stores said telephone number of said radio call received by said radio unit.

4. A radio apparatus according to claim 1, wherein said control unit controls said display unit to display said sequence of letters in said registration mode, produces a new telephone number composed of at least one letter which is selected from said displayed sequence of letters based on operations of said first selection key, second selection key and determination key of said operation unit, and stores the produced telephone number in said memory as said telephone number.

5. A radio apparatus according to claim 1, wherein said control unit controls said display unit to display sets of said counter party name and said telephone number, when one of said plurality of directory names which has been displayed on said display unit is selected based on operations of said first selection key, second selection key and determination key of said operation unit in said read mode, and controls a radio unit to automatically call one of said sets, when said one of said sets is selected based on operations of said first selection key, second selection key and determination key of said operation unit in said read mode.

6. A method of managing telephone numbers in a radio apparatus, comprising the steps of:
 displaying a name of each of a plurality of directories in a registration mode, each of said plurality of directories having a storage area of a predetermined size;
 designating one of the plurality of displayed directory names;
 inputting a name corresponding to a telephone number;
 storing said name and said telephone number in one of said plurality of directories of said storage unit which corresponds to said designated directory name;
 designating one of said registration mode, a read mode and a management mode;
 displaying said plurality of directory names in said management mode;
 designating one of the plurality of displayed directory names in said management mode;
 displaying management data of one of said plurality of directories corresponding to said designated directory name, said management data including a directory size, inputting a new directory size; and
 changing the size of said storage area of said directory corresponding to said designated directory name based on the new directory size.

7. A method according to claim 6, further comprising the steps of:
 inputting a new directory name in said registration mode; and
 allocating a storage area to a directory having said new directory name in response to the input of said new directory name.

8. A method according to claim 6, further comprising the step of:
 designating said telephone number received through a radio communication in said registration mode.

9. A method according to claim 6, further comprising the step of:
 inputting said telephone number in said registration mode.

10. A radio apparatus according to claim 6, further comprising: the steps of:
 displaying said plurality of directory names in said read mode;
 designating one of the plurality of displayed directory names in said read mode;
 displaying said names and said telephone numbers of one of said plurality of directories which has said designated directory name in said read mode;
 designating one of said displayed names; and
 automatically calling one of said displayed telephone numbers corresponding to said designated name.

11. A radio apparatus comprising:
 a storage unit having a plurality of directories each of which has a storage area of a predetermined size;
 display means for displaying a name of each of said plurality of directories in a registration mode;
 directory designating means for designating one of the plurality of displayed directory names;
 name inputting means for inputting a name corresponding to a telephone number;
 storing means for storing said name and said telephone number in one of said plurality of directories of said storage unit which corresponds to said designated directory name; and
 mode designating means for designating one of a read mode, a management mode, or said registration mode;
  said display means displays said plurality of directory names when said management mode is designated by said mode designating means,
  wherein said directory designating means designates one of the plurality of displayed directory names in said management mode,
  wherein said display means displays management data of one of said plurality of directories corresponding to said designated directory name, said management data including directory size, wherein said radio apparatus further comprises:
   size inputting means for inputting a new directory size; and
   size changing means for changing the size of said storage area of said directory corresponding to said designated directory name based on the new directory size.

12. A radio apparatus according to claim 11, further comprising:
 directory name inputting means for inputting a new directory name in said registration mode; and
 allocating means for allocating a storage area to a directory having said new directory name in response to the input of said new directory name.

13. A radio apparatus according to claim 11, further comprising:
 a memory unit for storing said telephone number received through a radio communication; and
 telephone number designating means for designating said telephone number stored in said memory unit in said registration mode.

14. A radio apparatus according to claim 11, further comprising:
 telephone number inputting means for inputting said telephone number in said registration mode.

15. A radio apparatus according to claim 11, wherein said display means displays said plurality of directory names when said read mode is designated by said mode designating means,
 wherein said directory designating means designates one of the plurality of displayed directory names in said read mode,
 wherein said display means displays said directory names and said telephone numbers of one of said plurality of directories which has said designated directory name in said read mode,
 wherein said radio apparatus further comprises:
  name designating means for designating one of said displayed directory names; and
  automatic dialing means for automatically calling one of said displayed telephone numbers corresponding to said designated directory names.

* * * * *